US006920281B1

(12) United States Patent
Agnibotri et al.

(10) Patent No.: US 6,920,281 B1
(45) Date of Patent: Jul. 19, 2005

(54) VIDEO MEMORY MANAGER FOR USE IN A VIDEO RECORDER AND METHOD OF OPERATION

(75) Inventors: Lalitha Agnibotri, Fishkill, NY (US); Nevenka Dimitrova, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1014 days.

(21) Appl. No.: 09/609,722

(22) Filed: Jun. 30, 2000

(51) Int. Cl.$^7$ ............................................. H04N 5/781
(52) U.S. Cl. ...................................... 386/125; 386/126
(58) Field of Search ............................... 386/1, 45, 46, 386/125, 126, 83; 348/231.1, 231.2; 725/46, 58; H04N 5/76, 9/79, 5/225

(56) References Cited

U.S. PATENT DOCUMENTS

| | | | |
|---|---|---|---|
| 4,796,107 A | 1/1989 | Hiraki | 360/33.1 |
| 5,166,911 A | 11/1992 | Misawa et al. | 368/10 |
| 5,488,409 A | 1/1996 | Yuen et al. | 348/5 |
| 5,652,613 A * | 7/1997 | Lazarus et al. | 725/50 |
| 5,734,444 A | 3/1998 | Yoshinobu | 348/731 |
| 5,764,800 A | 6/1998 | Yamagata | 382/232 |
| 5,818,510 A | 10/1998 | Cobbley et al. | 348/7 |
| 5,867,226 A | 2/1999 | Wehmeyer et al. | 348/563 |
| 6,188,831 B1 | 2/2001 | Ichimura | 386/69 |
| 6,324,338 B1 * | 11/2001 | Wood et al. | 386/83 |
| 6,459,497 B1 * | 10/2002 | Kashiwazaki | 358/1.15 |
| 2002/0118954 A1 * | 8/2002 | Barton et al. | 386/83 |
| 2002/0166035 A1 * | 11/2002 | Belknap et al. | 711/161 |

FOREIGN PATENT DOCUMENTS

| | | | |
|---|---|---|---|
| EP | 0713334 A2 | 5/1996 | H04N/5/507 |
| EP | 092072 A2 | 7/1999 | G11B/27/00 |
| WO | 0008852 | 2/1700 | H04N/5/91 |
| WO | 9222983 | 12/1992 | H04N/5/781 |
| WO | 0002195 A2 | 1/2000 | G11B/7/00 |
| WO | 0039707 | 7/2000 | G06F/17/30 |
| WO | 0058967 | 10/2000 | G11B/27/10 |

* cited by examiner

*Primary Examiner*—Thai Tran
(74) *Attorney, Agent, or Firm*—Edward W. Goodman (57) ABSTRACT

There is disclosed a video memory manager for use in a video recording device that stores of video programs on a disk drive. The video memory manager comprises a video memory controller for detecting that the disk drive does not contain sufficient storage space to store a next-to-be-recorded program. The video memory controller, in response to the detection, determines a first retention score associated with a first video program and a second retention score associated with a second video program. The first and second retention scores indicate a desirability of retaining the first and second video programs respectively. The video memory controller deletes a least desirable one of the first and second video programs.

20 Claims, 3 Drawing Sheets

VIDEO MEMORY MANAGER FOR USE IN A VIDEO RECORDER AND METHOD OF OPERATION

TECHNICAL FIELD OF THE INVENTION

The present invention is directed, in general, to video recorder devices and, more specifically, to a memory management system for managing the storage space of a disk drive-based video recorder.

BACKGROUND OF THE INVENTION

Video recorders are among the most popular consumer electronic devices in the marketplace. The most common type of video recorder is the video cassette recorder (VCR), which records several hours of video in analog format on a magnetic tape cassette. A VCR can record a television program received from a local antenna or from a cable system for later playback. Most VCRs can be programmed to record video from a user-selected channel beginning at a user-selected start time and ending at a user-selected end time.

More recently, however, video recorders that use computer magnetic hard disks rather than magnetic cassette tapes to store video programs have appeared in the market. For example, the ReplayTV™ recorder and the TiVO™ recorder digitally record television programs on hard disk drives using, for example, MPEG-2 compression. Disk-based recorders have numerous advantages over conventional VCR devices, including:

1) the ability to view the start of a television program while the end of the program is still being recorded. This allows a viewer who misses the start of a program to jump back and watch the program from the beginning, and then catch up with the ongoing television program by skipping the commercials;

2) the ability to pause while continuing to record a live program. This allows the viewer to pause the live broadcast to answer the phone, eat, go to the bathroom, and the like, and catch up with the live television program, again by skipping the commercials; and 3) the ability to record on any part of the disk that is blank. The blank portions of the disk need not be contiguous and the viewer can watch stored programs in any order.

However, a disk-based video recorder, like a conventional VCR device, is still limited in the amount of video content it can store. Despite recent dramatic increases in the storage capacity of hard disks and the development of new storage media, like read-write digital versatile disks (DVD-RW), the number of programs that can be recorded on a single disk remains relatively limited. Thus, as the computer hard disk becomes full, the prior art disk-based video recorders either cease recording or, with some limitations, overwrite existing programs. Unfortunately, the manner in which the prior art disk-based video recorders overwrite existing programs is relatively crude. The prior art disk-based video recorders may simply record new video programs beginning at the start of the disk or may overwrite the oldest existing program on the disk.

Therefore, there is a need in the art for improved disk-based video recording devices. In particular, there is a need in the art for a disk-based video recorder that is capable of intelligently selecting an existing program to be overwritten by a new program based on a variety of criteria. More particularly, there is a need in the art for a disk-based video recorder that selects an existing program to be overwritten based on criteria that are at least partially determined by viewer (user) preferences.

SUMMARY OF THE INVENTION

To address the above-discussed deficiencies of the prior art, it is a primary object of the present invention to provide a video memory manager for use in a video recording device capable of storing a plurality of video programs on a disk drive. In an advantageous embodiment of the present invention, the video memory manager comprises a video memory controller capable of detecting that the disk drive does not contain sufficient storage space to store a next-to-be-recorded program. The video memory controller, in response to the detection, determines a first retention score associated with a first one of the plurality of video programs and a second retention score associated with a second one of the plurality of video programs, wherein the first and second retention scores indicate a desirability of retaining the first and second video programs respectively, and wherein the video memory controller deletes a least desirable one of the first and second video programs.

According to one embodiment of the present invention, the video memory controller replaces the deleted least desirable video program with a program abstract identifying and describing the deleted least desirable video program.

According to another embodiment of the present invention, the memory controller compresses the least desirable video program prior to deleting the least desirable video program.

According to still another embodiment of the present invention, the video memory controller deletes the compressed least desirable video program if the video memory controller determines that the disk drive still does not contain sufficient storage space to store the next-to-be-recorded program after compression of the least desirable video program has occurred.

According to yet another embodiment of the present invention, the video memory controller determines the first retention score according to a plurality of factors associated with the first video program and determines the second retention score according to a plurality of factors associated with the second video program.

According to a further embodiment of the present invention, the plurality of factors comprises at least one of: 1) a user-entered rank ordering associated with said first and second video programs; 2) relative fairness of deleting said first video if said first video is associated with a first user of said video recording device and said second video is associated with a second user of said video recording device; 3) relative freshness of said first and second video programs; 4) relative durations of said first and second video programs compared to a duration of said next-to-be-recorded program; 5) relative similarity of a category of said first video program and a category of said second video program compared to a category of said next-to-be-recorded program; and 6) at least one of: A) a program genre ratings associated with said first and second video programs; B) a number of times a television series associated with said first video program has been viewed; and C) a program rating derived from at least one of: i) a user rating; and ii) a rating retrieved from a program guide.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the to specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
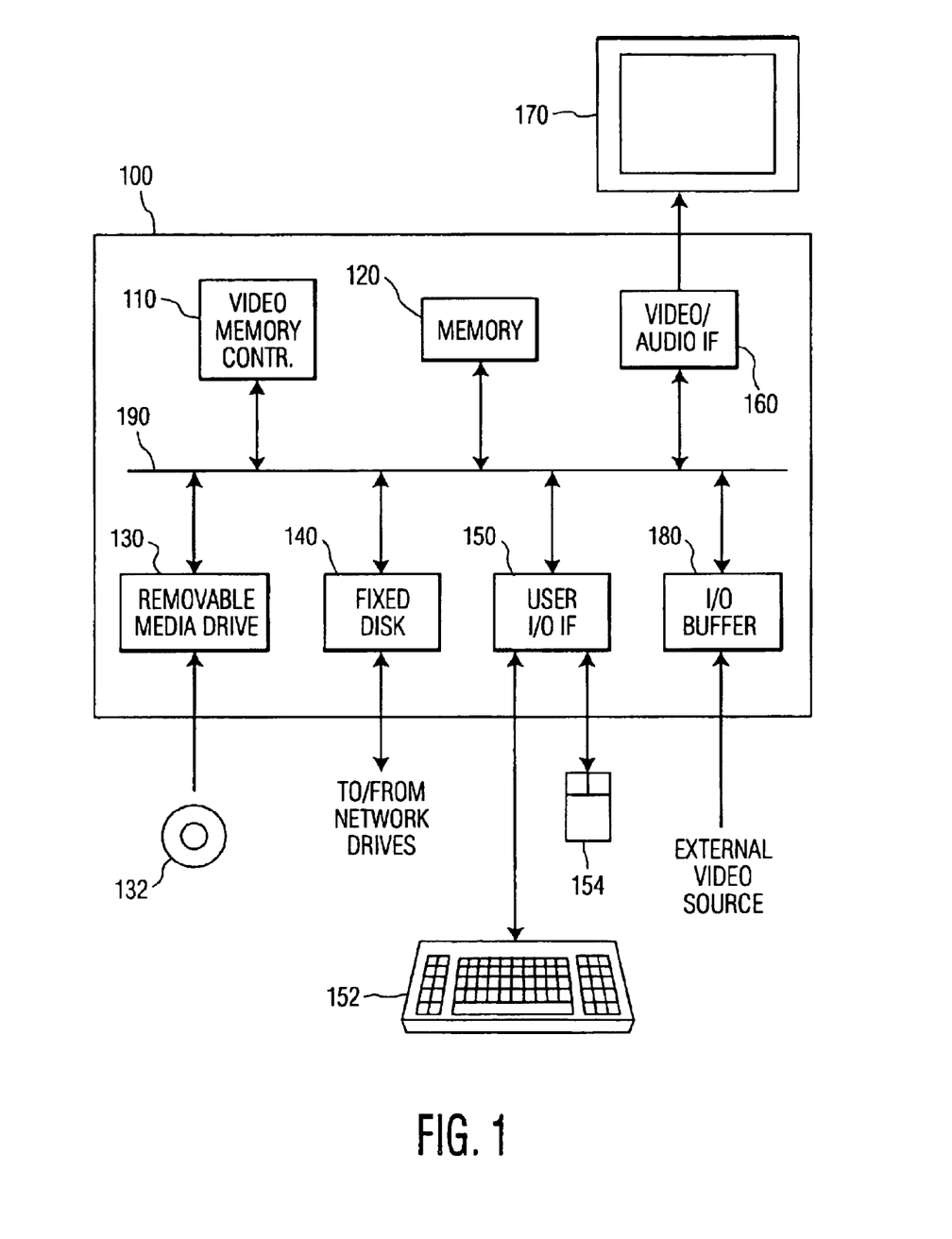
FIG. 1 illustrates an exemplary video recording system that contains a video memory manager in accordance with the principles of the present invention.
Figure 2:
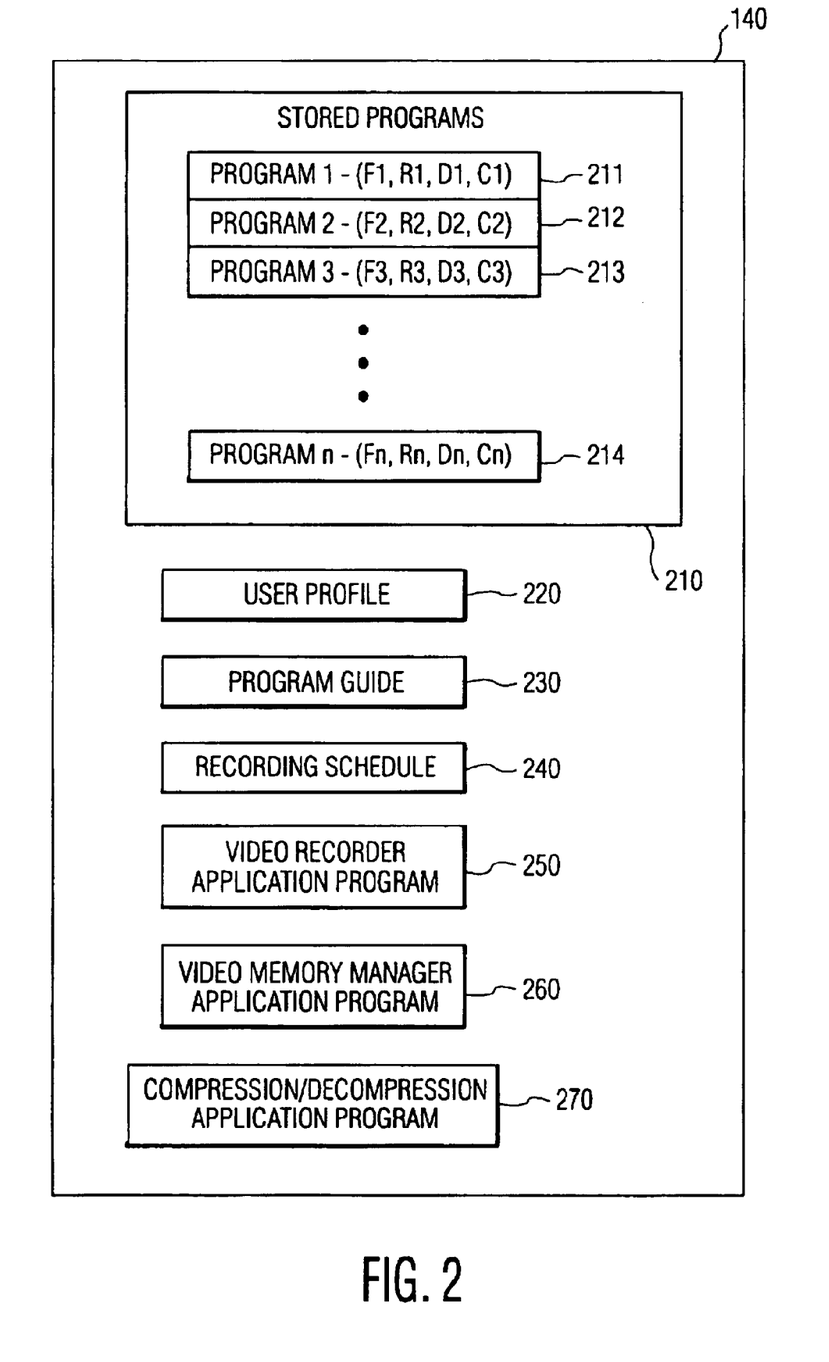
FIG. 2 illustrates in greater detail exemplary contents of the fixed disk drive in FIG. 1, including a video memory manager application program according to the principles of the present invention.
Figure 3:
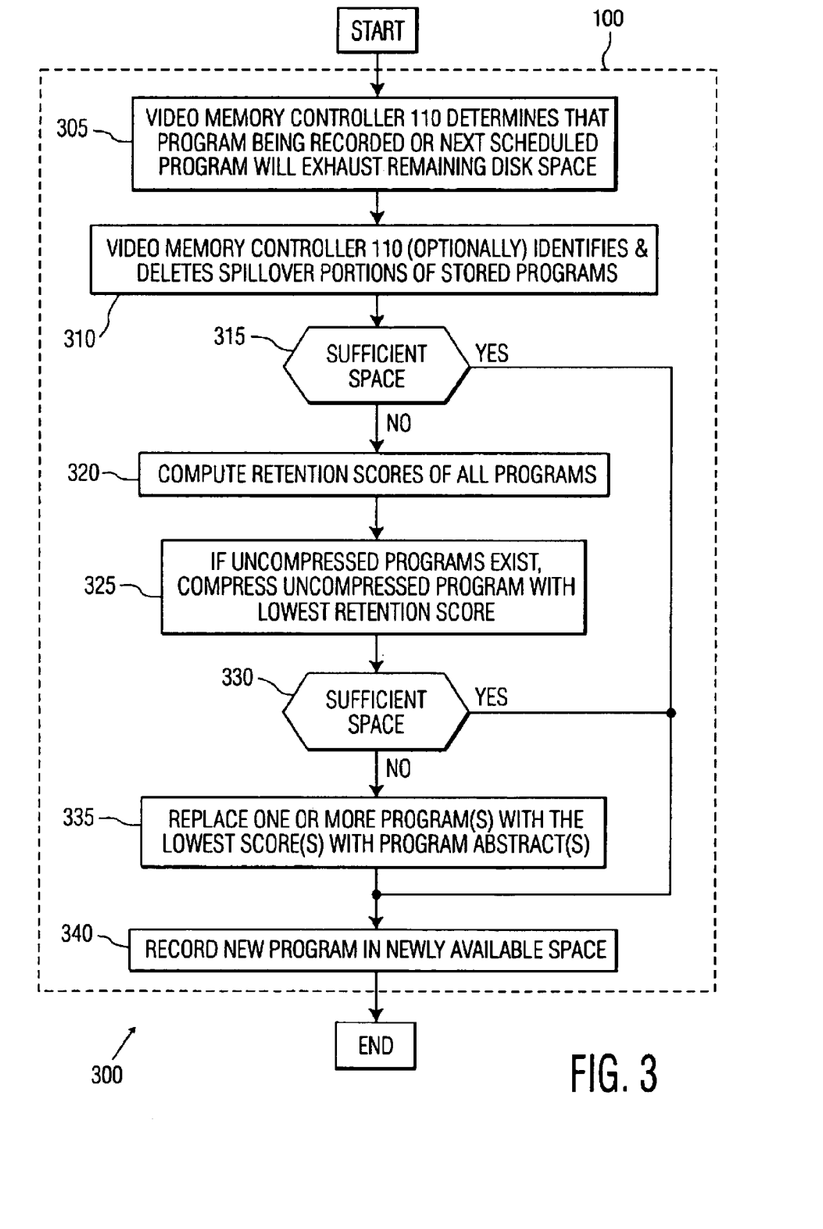
FIG. 3 is a flow diagram illustrating the operation of the exemplary video recording system in FIG. 1 according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged disk drive-based video recording system.

FIG. 1 illustrates exemplary video recording system 100 that contains a video memory manager in accordance with the principles of the present invention. Video recording system 100 comprises video memory controller 110, memory 120, removable media drive 130, fixed (i.e., "hard") disk drive 140, user input/output (I/O) interface (IF) 150, keyboard 152, and mouse 154 (or similar pointing device). Video recording system 100 further comprises video/audio interface (IF) 160, monitor 170, and video input/output (I/O) buffer 180.

Memory 120 may comprise volatile memory, such as dynamic random access memory (DRAM), non-volatile memory, such as flash RAM, or a combination of volatile and non-volatile memory. Removable media drive 130 may be any type of storage device that is capable of reading from and/or writing to a removable storage medium, such as a 3.5 inch floppy diskette, a CD-ROM, a writable CD, a digital versatile disk (DVD), or the like. A removable storage medium, such as CD-ROM 132, may be used to load video clips into fixed disk 140. Fixed disk drive 140 provides fast access for storage and retrieval of application programs and data, including stored video programs that are controlled by a video memory manager according to the principles of the present invention.

For the purposes of this application and the claims that follow, fixed disk drive 140 is defined to include any mass storage device that is both readable and writable, including conventional magnetic disk drives and optical disk drives for read/write digital versatile disks (DVD-RW), re-writable CD-ROMs, and the like. In fact, fixed disk drive 140 need not be fixed in the conventional sense that is permanently embedded in video recording system 100. Rather, fixed disk drive 140 includes any mass storage device that is dedicated to video recording system 100 for the purpose of storing video programs. Thus, fixed disk drive 140 may include an attached peripheral drive or removable disk drives (whether embedded or attached), such as a juke box device that holds read/write DVDs or re-writable CD-ROMs. Furthermore, in an advantageous embodiment of the present invention, fixed disk drive 140 may include external mass storage devices that video recording system 100 may access and control via a network connection, including, for example, a disk drive in the user's home personal computer (PC) or a disk drive on a server at the user's Internet service provider (ISP).

Keyboard 152 and mouse 154 are coupled to video recording system 100 via user I/O IF 150. Monitor 170 is coupled to video recording system 100 via video/audio IF 160. Video recording system 100 receives incoming video via I/O buffer 180 from an external video source, such as a cable television system, an antenna and television receiver, or a video cassette recorder (VCR). The internal components of video recording system 100, including video memory controller 110, memory 120, removable media drive 130, fixed disk drive 140, user I/O IF 150, video/audio IF 160, and I/O buffer 180 are coupled to and communicate across internal communication bus 190.

In an advantageous embodiment of the present invention, a video memory manager according to the principles of the present invention may comprise a controller (i.e., video memory controller 110) that is implemented using a conventional data processor that executes a video memory manager application program stored in memory 120. Since the video memory manager application program may be transferred into memory 120 from a removable storage medium, the present invention may be implemented as a video memory manager application program stored on, for example, CD-ROM 132.

It should be noted that a video memory manager according to the principles may be implemented in any number of different video processing systems, including specific purpose disk-based video recorders or general purpose data processing devices, such as personal computers. Specific purpose disk-based video recorders include consumer electronic devices such as a TiVO™ video recorder or a ReplayTV™ video recorder.

The specific embodiment of video recording system 100 illustrated in FIG. 1 and described above more closely resembles a general purpose processing device, such as a personal computer (PC) embodiment of the present invention. However, this is by way of illustrations only and should not be construed so as to limit the scope of the present invention. Those skilled in the art will readily understand that the present invention, as described in the specific embodiment of video recording system 100 shown in FIG. 1, may easily be adapted for use in a specific purpose disk-based video recorder or similar consumer electronic device.

More specifically, a disk-based video recorder embodiment of video recording system 100 may use, for example, a hand-held remote control and an infrared (IR) sensor interface in place of user I/O IF 150, keyboard 152 and mouse 154. A disk-based video recorder embodiment of video recording system 100 also may be coupled to a conventional television set rather than monitor 170.

FIG. 2 illustrates in greater detail exemplary contents of fixed disk drive 140, including video memory manager application program 260 according to the principles of the present invention. Fixed disk drive 140 stores, among other things, stored programs 210, user profile 220, program guide 230, recording schedule 240, video recorder application program 250, video memory manager application program 260, and compression-decompression application program 270. Stored programs 210 comprise N stored video programs, including exemplary program 211, exemplary program 212, exemplary program 213, and exemplary program 214, among others. Exemplary programs 211–214 are arbitrarily labeled Program 1, Program 2, Program 3, and Program N, respectively.

As will be explained below in greater detail, when fixed disk drive 140 begins to run out of space, video memory controller 110, under control of video memory manager application program 260, decides which video programs to save and which video programs to record over based on a lowest score criteria. The lowest score criteria is determined from a plurality of factors (F-freshness, R-Rating, D-Duration, and C-Category) and weighting coefficients associated with each video program stored on fixed disk drive 140. The factors associated with program 211 are (F1, R1, D1, C1). The factors associated with program 212 are (F2, R2, D2, C2). The factors associated with program 213 are (F3, R3, D3, C3). Finally, the factors associated with program 214 are (Fn, Rn, Dn, Cn).

User profile 220 comprises user-specific data that is used to determine which program to record over. In an exemplary embodiment of the present invention, a user (viewer) may manually enter user preferences that indicate preferred categories of programs (sports, news, etc.) as well as preferred individual programs. The user preferences may then used by video memory controller 110 to determine, for example, weighting coefficients that weight the relative values of the (F, R, D, C) factors in determining the lowest score.

Program guide 230 comprises an electronic program guide that lists program information regarding program broadcast times (e.g., day, date, start time, stop time), program channel, program category information, program synopsis, and the like. Typically, electronic program guides are broadcast by a cable service provider in a particular channel. The electronic program guides are accessible to the user by pressing a particular button (e.g., MENU button, INFO button, GUIDE button) on the remote control. The information in program guide 230 is used to schedule the recording of video programs and to determine which programs to delete when fixed disk drive 140 becomes full.

Recording schedule 240 comprises data regarding programs that have been scheduled to be recorded by a user. Video recorder application program 250 controls the overall operation of video recoding system 100. Video recorder application program 250 displays program information from program guide 230 on the screen of monitor 170, receives user inputs regarding programs to be recorded, and stores the recording information in recording schedule 240. At the appropriate time, video recorder application program 250 records a scheduled program onto fixed disk drive 140.

Video memory manager application program 260 performs the memory management functions as fixed disk drive 140 begin to run out of space. As will be explained below in greater detail, video memory manager application program 260 is always active and runs as a background task while video recorder application program 250 performs the basic recording functions of a video recorder. Compression-decompression application program 270 is activated by video memory manager application program 260 in order to compress uncompressed video programs or to further compress partially compressed video programs. For example, some video programs may be stored on fixed disk drive 140 as uncompressed NTSC video data. When activated, compression-decompression application program 270 may compress the uncompressed video data into, for example, MPEG-2 data. Additionally, some video programs may be stored on fixed disk drive 140 as, for example, partially compressed MPEG-2 data. As is well known, the MPEG-2 standard provides for different levels of compression (e.g., low, medium, and high) depending on the available bandwidth and the processing speed of the receiver. To make more room on fixed disk drive 140, compression-decompression application program 270 may further compress the partially compressed MPEG-2 files.

FIG. 3 depicts flow diagram 300, which illustrates the operation of exemplary video recording system 100 according to one embodiment of the present invention. During the normal operation of video recording system 100, video memory controller 110, under control of video memory manager application program 260, may determine that the program currently being recorded or the next scheduled program will exhaust the remaining disk space on fixed disk drive 140. The program currently being recorded includes situations in which the viewer spontaneously presses the RECORD button during a video program. Video memory controller 110 may determine this information by examining the data in program guide 230, which indicates the start times and stop times of all programs. Video memory controller 110 also may determine this information by examining the data in recording schedule 240, which indicates the start times and stop times of all scheduled program recordings (process step 305).

Optionally, video memory controller 110 may identify "spillover" portions of recorded program in order to delete the spillover portion. A spillover occurs when a recorded program runs beyond its scheduled time period, such as when a sports program runs longer than anticipated (process step 310). After deleting any spillover portions, video memory controller 110 again determines if there is sufficient space to record the current program or the next scheduled program (process step 315). If there is now sufficient space, video recording system 100 records the new program on fixed disk drive 140, including in the newly available space (process step 340).

If there still is not sufficient space, video memory controller 110 may compute retention scores for all programs currently on fixed disk drive 140 (process step 320). In one embodiment of the present invention, the algorithm used to determine retention scores may assign low scores to programs that are the least desirable to retain. In such an embodiment, the video program having the lowest retention score is deleted. In an alternate embodiment of the present invention, the algorithm used to determine retention scores may assign high scores to programs that are the least desirable to retain. In such an embodiment, the video program having the highest retention score is deleted.

In one embodiment of the present invention, the retention score may be entirely derived from user-entered data. That is, the user may simply rank order video programs as the video programs are recorded or at some point after the video programs are recorded. In such a simple scenario, the retention score is determined by the user-entered rank ordering. Alternatively, the retention score may be determined entirely by video memory controller 110 using the calculated factors described hereafter. In still other embodiments, the retention score may be determined from a combination of a user-entered rank ordering and the factors calculated by video memory controller 110.

In an exemplary embodiment of the present invention, the retention scores are calculated using the (F, R, D, C) factors associated with each of programs 211–214 and the program having the lowest retention score is deleted. Video memory controller 110 may calculate Freshness (F) factor for each program as the ratio of the number of hours since the oldest program was recorded to the number of hours since a selected program was recorded. For example:

$$F1=X/Y$$

where: X=No. of Hrs. since oldest program was recorded; and

Y=No. of Hrs. since Program 1 was recorded

Video memory controller 110 may calculate Rating (R) factor for each program as the product of: A) the number of times the television series to which a program belongs gets viewed; B) rating for the genre (from implicitly gathered user statistics stored in user profile 220); and C) rating for the program given: i) by the user (from explicitly entered user rating stored in user profile 220) or ii) by a program review (such as from a film critic) retrieved from program guide 230. For example:

$$R1=A*B*C$$

where: A=number of times Program 1 was played;

B=rating for the genre (e.g., scale of 1–10 value); and

C=user selected rating for Program 1 (e.g., scale of 1–10 value).

Video memory controller 110 may calculate the Duration (D) factor for each program as the difference between the duration of a stored program and the duration of the new program to be recorded. For example:
1. If (Duration of Program 1–Duration of new program)=0 minutes, then D1=0;
2. If (Duration of Program 1–Duration of new program)= 1–30 minutes, then D1=5; and
3. If (Duration of Program 1–Duration of new program)= 30–60 minutes, D1=7;
4. Otherwise, D1=10.

Finally, video memory controller 110 may calculate the Category (C) factor for each program according to the similarity between the stored program and the new program to be recorded. For example:
1. If Program 1 and the new program have the same category, then C1=0;
2. If Program 1 and the new program have similar categories, then C1=5;
3. Otherwise, C1=10.

Once all of the (F, R, D, C) factors are known, a composite retention score may be calculated using one or more weighting factors. For example, the retention score (RS) for Program 1 may be determined by the equation:

$$RS1=w*F1+x*R1+y*D1+z*C1$$

where the weighting coefficients w, x, y, and z could either be preset default values or may be entered by the user to indicate the relative importance of each factor.

In an advantageous embodiment of the present invention, the retention score may also be weighted to account for other users of video recording system 100. For example, fixed disk drive 140 may contain more that one user profile (one for each member of a household, for example) with different groups of stored programs associated with each user profile. Video memory controller 110 may calculate a sharing factor (S) that provides for a more fair or more equitable algorithm for deleting programs. In a simple embodiment, video memory controller 110 may delete one program for each user in sequence until sufficient storage space is available. In a more complex embodiment, the sharing (S) factor may be weighted and added into the (F, R, D, C) factors, such that a parent has a higher S factor than a child and the retention scores of the parent's programs generally will be higher.

Once the retention scores of all program are calculated, video memory controller 110 may direct compression-decompression application program 270 to compress the uncompressed program (or to further compress an already partially compressed program) with the lowest retention score (process step 325). If there is now sufficient space, video recording system 100 records the new program on fixed disk drive 140, including in the newly available space (process step 340). If there still is not sufficient space, video memory controller 110 may delete one or more video programs with the lowest retention scores and replace them with program abstracts (process step 335).

In an advantageous embodiment of the present invention, video recording system 100 may include a feedback capability that allows video memory controller 110 to prompt the user, either locally or remotely, prior to deleting a video program. By way of example, video memory controller 110 may display on monitor 170 the next N video programs to be deleted as determined (in advance) by the retention scores of the N programs and the contents of recording schedule 240. Ths user may then re-prioritize the sequence of pending deletions by entering the user's own rank ordering, as described above. In another example, video memory controller 110 may transmit an e-mail or a paging message via any externally connected network to notify the user of the next N video programs to be deleted. Once again, the user may re-prioritize the sequence of pending deletions by entering the user's own rank ordering in a reply e-mail or a reply page.

In an advantageous embodiment of the present invention, video memory manager application program 260 is an adaptive program that learns from user feedback and adjusts the calculation of future retention scores accordingly. In an exemplary adaptive system, video memory controller 110 may modify the weighting coefficients W, x, Y, and z to account for trends detected in user rank-orderings that indicate changes in the relative importance to the user of certain factors, such as program category or genre.

For the purposes of this application and the claims that follow, a program abstract is defined to include video data, such as a video trailer, audio data, and text data, or any combination of two or more of these elements. The program abstract may be directly retrieved from program guide 230 or may be generated by video memory controller 110 itself using content from the deleted program and/or data retrieved from program guide 230. The program abstract may be compressed or uncompressed. That is, video memory controller 110 may (optionally) compress the program abstract to save storage space. Thus, a program abstract comprising a video trailer, audio and text may be compressed by further compression of the video content, deleting the video and retaining the text and audio content, replacing the video content with still frames extracted from the video, or any similar technique. Finally, video recording system 100 records the new program on fixed disk drive 140, including in the newly available space (process step 340).

Although the present invention has been described in detail, those skilled in the art should understand that they can make various changes, substitutions and alterations herein without departing from the spirit and scope of the invention in its broadest form.

What is claimed is:

1. A video memory manager for use in a video recording device capable of storing a plurality of video programs on a disk drive, said video memory manager comprising:
 a video memory controller capable of detecting that said disk drive does not contain sufficient storage space to store a next-to-be-recorded program, wherein said video memory controller, in response to said detection, determines a first retention score associated with a first one of said plurality of video programs and a second retention score associated with a second one of said plurality of video programs, wherein said first and second retention scores indicate a desirability of retaining said first and second video programs respectively, and wherein said video memory controller deletes a least desirable one of said first and second video programs,
wherein said video memory controller replaces said deleted least desirable video program with a program abstract identifying and describing said deleted least desirable video program.

2. The video memory manager as claimed in claim 1, wherein said video memory controller determines said first and second retention scores according to a plurality of factors associated with said first and second video programs.

3. The video memory manager as claimed in claim 2, wherein said plurality of factors comprises at least one of:
 a user-entered rank ordering associated with said first and second video programs;
 relative fairness of deleting said first video if said first video is associated with a first user of said video recording device and said second video is associated with a second user of said video recording device;
 relative freshness of said first and second video programs;
 relative durations of said first and second video programs compared to a duration of said next-to-be-recorded program;
 relative similarity of a category of said first video program and a category of said second video program compared to a category of said next-to-be-recorded program; and
 at least one of: 1) a program genre ratings associated with said first and second video programs; 2) a number of times a television series associated with said first video program has been viewed; and 3) a program rating derived from at least one of: A) a user rating; and B) a rating retrieved from a program guide.

4. A video memory manager for use in a video recording device capable of storing a plurality of video programs on a disk drive, said video memory manager comprising:
 a video memory controller capable of detecting that said disk drive does not contain sufficient storage space to store a next-to-be-recorded program, wherein said video memory controller, in response to said detection, determines a first retention score associated with a first one of said plurality of video programs and a second retention score associated with a second one of said plurality of video programs, wherein said first and second retention scores indicate a desirability of retaining said first and second video programs respectively, and wherein said video memory controller deletes a least desirable one of said first and second video programs,
wherein said video memory controller compresses said least desirable video program prior to deleting said least desirable video program, and stores said compressed least desirable video program in place of said deleted least desirable video program.

5. The video memory manager as claimed in claim 4, wherein said video memory controller deletes said compressed least desirable video program if said video memory controller determines that said disk drive still does not contain sufficient storage space to store said next-to-be-recorded program after compression of said least desirable video program has occurred.

6. A video recording device comprising:
 a disk drive capable of storing a plurality of video programs;
 a video recording controller capable of receiving incoming video programs from an external source and storing said received incoming video programs on said disk drive; and
 a video memory controller capable of detecting that said disk drive does not contain sufficient storage space to store a next-to-be-recorded program, wherein said video memory controller, in response to said detection, determines a first retention score associated with a first one of said plurality of video programs and a second retention score associated with a second one of said plurality of video programs, wherein said first and second retention scores indicate a desirability of retaining said first and second video programs respectively, and wherein said video memory controller deletes a least desirable one of said first and second video programs,
wherein said video memory controller replaces said deleted least desirable video program with a program abstract identifying and describing said deleted least desirable video program.

7. The video recording device as claimed in claim 6, wherein said video memory controller determines said first and second retention scores according to a plurality of factors associated with said first and second video programs.

8. The video recording device as claimed in claim 7, wherein said plurality of factors comprises at least one of:
 a user-entered rank ordering associated with said first and second video programs;
 relative fairness of deleting said first video if said first video is associated with a first user of said video recording device and said second video is associated with a second user of said video recording device;

relative freshness of said first and second video programs;

relative durations of said first and second video programs compared to a duration of said next-to-be-recorded program;

relative similarity of a category of said first video program and a category of said second video program compared to a category of said next-to-be-recorded program; and at least one of: 1) a program genre ratings associated with said first and second video programs; 2) a number of times a television series associated with said first video program has been viewed; and 3) a program rating derived from at least one of: A) a user rating; and B) a rating retrieved from a program guide.

9. A video recording device comprising:

a disk drive capable of storing a plurality of video programs;

a video recording controller capable of receiving incoming video programs from an external source and storing said received incoming video programs on said disk drive; and a video memory controller capable of detecting that said disk drive does not contain sufficient storage space to store a next-to-be-recorded program, wherein said video memory controller, in response to said detection, determines a first retention score associated with a first one of said plurality of video programs and a second retention score associated with a second one of said plurality of video programs, wherein said first and second retention scores indicate a desirability of retaining said first and second video programs respectively, and wherein said video memory controller deletes a least desirable one of said first and second video programs, wherein said video memory controller compresses said least desirable video program prior to deleting said least desirable video program, and stores said compressed least desirable video program in place of said deleted least desirable video program.

10. The video recording device as claimed in claim 9, wherein said video memory controller deletes said compressed least desirable video program if said video memory controller determines that said disk drive still does not contain sufficient storage space to store said next-to-be-recorded program after compression of said least desirable video program has occurred.

11. A method of managing a plurality of stored video programs for use in a video recording device capable of storing a plurality of video programs on a disk drive, the method comprising the steps of:

detecting that the disk drive does not contain sufficient storage space to store a next-to-be-recorded program;

determining a first retention score associated with a first one of the plurality of video programs;

determining a second retention score associated with a second one of the plurality of video programs, wherein the first and second retention scores indicate a desirability of retaining the first and second video programs respectively, and deleting a least desirable one of the first and second video programs, wherein the method further comprises the step of:

replacing the deleted least desirable video program with a program abstract identifying and describing the deleted least desirable video program.

12. The method as claimed in claim 11, wherein the first and second retention scores are determined according to a plurality of factors associated with the first and second video programs.

13. The method as claimed in claim 12, wherein the plurality of factors comprises at least one of:

a user-entered rank ordering associated with the first and second video programs;

relative fairness of deleting the first video if the first video is associated with a first user of the video recording device and the second video is associated with a second user of the video recording device;

relative freshness of the first and second video programs;

relative durations of the first and second video programs compared to a duration of the next-to-be-recorded program;

relative similarity of a category of the first video program and a category of the second video program compared to a category of the next-to-be-recorded program; and at least one of: 1) a program genre ratings associated with the first and second video programs; 2) a number of times a television series associated with said first video program has been viewed, and 3) a program rating derived from at least one of: A) a user rating; and B) a rating retrieved from a program guide.

14. A method of managing a plurality of stored video programs for use in a video recording device capable of storing a plurality of video programs on a disk drive, the method comprising the steps of:

detecting that the disk drive does not contain sufficient storage space to store a next-to-be-recorded program;

determining a first retention score associated with a first one of the plurality of video programs;

determining a second retention score associated with a second one of the plurality of video programs, wherein the first and second retention scores indicate a desirability of retaining the first and second video programs respectively; and deleting a least desirable one of the first and second video programs, wherein the method further comprises the steps of:

compressing the least desirable video program prior to the step of deleting the least desirable video program; and storing said compressed least desirable video program in place of said deleted least desirable video program.

15. The method as claimed in claim 14, wherein said method further comprises the step of:

deleting the compressed least desirable video program in response to a determination that the disk drive still does not contain sufficient storage space to store the next-to-be-recorded program after compression of the least desirable video program has occurred.

16. A computer-readable storage medium, for use in a video recording device capable of storing a plurality of video programs on a disk drive, containing computer-executable instructions for managing the plurality of stored video programs, the computer-executable instructions comprising the steps of:

detecting that the disk drive does not contain sufficient storage space to store a next-to-be-recorded program;

determining a first retention score associated with a first one of the plurality of video programs;

determining a second retention score associated with a second one of the plurality of video programs, wherein the first and second retention scores indicate a desirability of retaining the first and second video programs respectively; and deleting a least desirable one of the first and second video programs, wherein the computer-executable instructions further comprise the step of:

replacing the deleted least desirable video program with a program abstract identifying and describing the deleted least desirable video program.

17. The computer-readable storage medium as claimed in claim 16, wherein the first and second retention scores are determined according to a plurality of factors associated with the first and second video programs.

18. The computer-readable storage medium as claimed in claim 17, wherein the plurality of factors comprises at least one of:

a user-entered rank ordering associated with the first and second video programs;

relative fairness of deleting the first video if the first video is associated with a first user of the video recording device and the second video is associated with a second user of the video recording device;

relative freshness of the first and second video programs;

relative durations of the first and second video programs compared to a duration of the next-to-be-recorded program;

relative similarity of a category of the first video program and a category of the second video program compared to a category of the next-to-be-recorded program; and at least one of: 1) a program genre ratings associated with the first and second video programs; 2) a number of times a television series associated with the first video program has been viewed; and 3) a program rating derived from at least one of: A) a user rating; and B) a rating retrieved from a program guide.

19. A computer-readable storage medium, for use in a video recording device capable of storing a plurality of video programs on a disk drive, containing computer-executable instructions for managing the plurality of stored video programs, the computer-executable instructions comprising the steps of:

detecting that the disk drive does not contain sufficient storage space to store a next-to-be-recorded program;

determining a first retention score associated with a first one of the plurality of video programs;

determining a second retention score associated with a second one of the plurality of video programs, wherein the first and second retention scores indicate a desirability of retaining the first and second video programs respectively; and deleting a least desirable one of the first and second video programs, wherein the computer-executable instructions further comprise the steps of:

compressing the least desirable video program prior to the step of deleting the least desirable video program; and storing said compressed least desirable video program in place of said deleted least desirable video program.

20. The computer-readable storage medium as claimed in claim 19, wherein the computer-executable instructions further comprise the step of:

deleting the compressed least desirable video program in response to a determination that the disk drive still does not contain sufficient storage space to store the next-to-be-recorded program after compression of the least desirable video program has occurred.

* * * * *

UNITED STATES PATENT AND TRADEMARK OFFICE
CERTIFICATE OF CORRECTION

PATENT NO. : 6,920,281 B1  Page 1 of 1
APPLICATION NO. : 09/609722
DATED : July 19, 2005
INVENTOR(S) : Lalitha Agnihotri et al.

It is certified that error appears in the above-identified patent and that said Letters Patent is hereby corrected as shown below:

On the title page, the title of the application should read as follows:

Item [75] Inventors: Lalitha AGNIHOTRI, Fishkill, NY (US); Nevenka DIMITROVA, Yorktown Heights, NY (US)

Signed and Sealed this

Sixteenth Day of November, 2010

David J. Kappos
*Director of the United States Patent and Trademark Office*